UNITED STATES PATENT OFFICE.

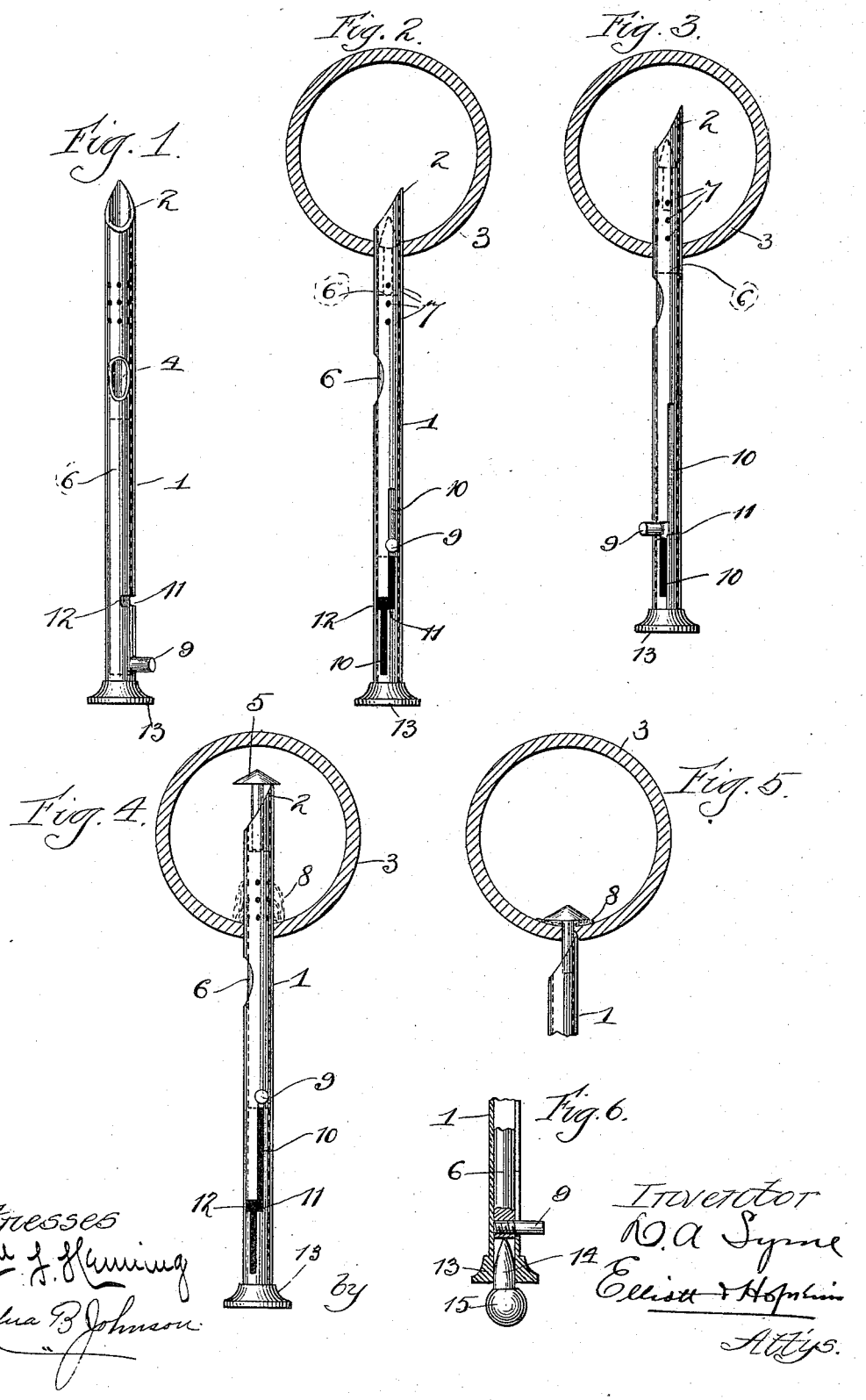

DAVID A. SYME, OF ELMHURST, ILLINOIS, ASSIGNOR OF ONE-THIRD TO OTTO H. FLEISCHER, OF CHICAGO, ILLINOIS.

TOOL FOR REPAIRING PNEUMATIC TIRES.

SPECIFICATION forming part of Letters Patent No. 573,049, dated December 15, 1896.

Application filed October 24, 1895. Serial No. 566,712. (No model.)

*To all whom it may concern:*

Be it known that I, DAVID A. SYME, a citizen of the United States, residing at Elmhurst, in the county of Du Page, State of Illinois, have invented certain new and useful Improvements in Means for Repairing Pneumatic or Hollow Vehicle-Tires and other Tubes, of which the following is a full, clear, and exact specification.

My invention relates more particularly to the means for securing a patch on the inside of a velocipede pneumatic tire by inserting the same through the puncture or rupture from the outside, and the means have reference to that class of repair-tools in which the plug is conveyed through the puncture and into the tire by means of a pointed tube and subsequently forced out of the inserted end of the tube by means of a plunger adapted to pass through the tube from the outer end.

Heretofore in repairing punctures by such method it has been common in some instances to apply the paste to the plug before the same is inserted into the tube, while in other instances the paste has been conveyed into the interior of the tire by a cavity in the plunger; but in either event it is found in practice that the inserting-tools will in the majority of cases either rub substantially all the paste off of the plug while being inserted or else rub the paste off of the interior of the tire and carry it out through the puncture when the tool is withdrawn.

The purpose of my invention is to avoid these defects; and it has for its primary object to inject a copious supply of paste into the tire around the puncture and against the under side of the plug after the latter has been inserted and to avoid again withdrawing the paste by the withdrawal of the tool.

My invention has for its object, further, to provide a simple and efficient repair-tool which may be readily used by unskilled persons.

With these ends in view my invention consists in certain features of novelty by which the said objects and certain other objects hereinafter described are attained, all as fully described with reference to the accompanying drawings and more particularly pointed out in the claims.

In the said drawings, Figure 1 is a side elevation of my improved repair-tool, showing the plunger retracted. Fig. 2 is a view thereof, taken at right angles to the view in Fig. 1, showing the first step in the operation of inserting the plug into the tire. Fig. 3 is a similar view showing the position of the tool just before the paste is injected into the tire. Fig. 4 is a similar view showing the position of the tool and the plug after the plunger has been forced into it for injecting the paste. Fig. 5 is a cross-section of the tire and an elevation of the upper end of the repair-tool, showing the latter just before it is withdrawn and illustrating the manner in which the plug is left in the puncture; and Fig. 6 is a longitudinal sectional view of the end of the repair-tool, showing a slight modification hereinafter described.

In cementing plugs into the punctured tires or tubing according to my invention I place the plug in the end of the inserting-tube and then insert the tube through the puncture. When in this position it will be understood that the plug will prevent the escape of the air through the inserting-tube. While the inserting-tube is in this position, or, if desired, immediately after the plug has been placed therein, a suitable amount of cement is injected into the tube just behind the plug. The inserting-tube is then pushed into the tire until an outlet or perforation formed in the inserting-tube for the discharge of the cement is wholly within the tire. After this has been done the cement is injected into the tire around the inserting-tube through such outlet or perforation, and by the same action the plug is partially expelled from the end of the tube, so that its head will rest above the tube. Then by withdrawing the inserting-tube the stem of the plug is pulled out through the puncture and the head of the plug set in position in the cement. While this is being done, the air is prevented from escaping through the tube by means of a plunger or other device by which the cement has been expelled. By this method it will be seen that the tire may be repaired without causing its deflation.

I will now describe my improved repair-tool by which this method may be carried out.

1 represents a tube which is preferably cylindrical and has its inserting end sheared off at an angle, as shown at 2, whereby a point is formed which will adapt the inserting-tube to be passed through the puncture formed in the tire 3. The tube 1, a short distance from its point 2, is provided with an opening 4 for the admisssion of the plug 5, which may be forced through the opening 4 and into the tube with its head projecting toward the point of the tube in the ordinary or any suitable manner. Fitting reasonably accurately within the tube 1 is a plunger 6, by which the plug 5, after its insertion through the opening 4, may be forced along the tube 1 to a position near the point thereof in the manner shown in Fig. 2. This is done, preferably, before the tube 1 is inserted through the puncture in the tire. While the plug 5 is in this position, the tube 1 is inserted through the puncture to the extent shown in Fig. 2, and with the parts in this relation it will be seen that the plug 5 will prevent the deflation of the tire through the tube 1. After this operation has been performed the plunger 6 is withdrawn until the aperture 4 is uncovered, as shown in Fig. 1, and a suitable quantity of cement is then injected into the tube 1 through the aperture 4 by placing the nozzle of the usual compressible can in the aperture 4 and squeezing the can or in any other suitable manner. The plunger 6 is then forced inward until the aperture 4 is completely closed, as shown in Fig. 3, and the tube 1 is then inserted farther into the tire until the apertures or perforations 7, formed in the tube 1 between its point and the aperture 4, arrive at a position wholly within the tire, as shown in Fig. 3, with the tire hugging an imperforate part of the tube 1 between the series of perforations 7 and the aperture 4. While in this position it will be seen that the deflation of the tire is still prevented because the discharge of the air through the perforation 7 is arrested by the cement in the tube 1 and the plunger 6. The plunger is now forced inward to the full extent of its movement, so as to simultaneously cause the injection of the cement 8 into the tire and around the tube 1 and the expulsion of the plug 5 a sufficient extent to bring its head above the tube, as shown in Fig. 4. The inserting-tube 1 is now withdrawn and it will be seen that the stem of the plug will be carried outward through the perforation in the tire as the tube 1 recedes, and the head of the plug will be set in a copious supply of the cement, and the defect of prior devices in rubbing the cement off of the plug during its insertion or dragging the cement out of the tire through the puncture by the inserting-tube is entirely avoided.

In order to facilitate the operation of my repair-tool by unskilled persons, the plunger 6 is provided with a knob or button 9, which runs in a longitudinal slot 10, formed in the tube 1, and this slot is provided with an offset 11, the purpose of which is to automatically arrest the inward movement of the plunger at the proper position, as shown in Fig. 3, after the cement has been inserted into the tube, and thus absolutely guard against the operator forcing the cement through the perforations 7 before the tube 1 has been inserted to the position shown in Fig. 3. After the tube 1 has been inserted to the position shown in Fig. 3 the knob or button 9 is turned to the right and then forced along the slot 10 as far as it will go for simultaneously expelling the cement and the plug. In order, however, that the pressure of the air within the tire may not force the cement and plunger outward while the tube is in the position shown in Fig. 3, the offset 11 is provided with a notch 12 at one end, so that the knob 9 may be thrown to the left and thus lock the plunger against outward movement.

The knob 13 on the end of the tube 1 for facilitating its insertion into the tire may be provided with a perforation or opening coincident with the interior of the tube 1, and the knob 9 may be removable from the plunger 6, as shown in Fig. 6, so that, if desired, the plunger 6 may be withdrawn from the tube 1 for cleaning or other purposes.

In order that the operator may have means ready at hand for forcing the plug 5 through the aperture 4 into the tube 1, I provide a sharp-pointed instrument 14, which may be provided with a knob or handle 15, and for the sake of convenience may be fitted within the rear end of the tube 1 when not in use.

Having thus described my invention, what I claim as new therein, and desire to secure by Letters Patent, is—

1. A repair-tool for the purpose described having in combination a tube provided with a point and having a cement-outlet near said point, a portion of the tube between the point and said cement-outlet being imperforate throughout its circumference, and a plunger fitting within and closing said tube, substantially as set forth.

2. A repair-tool for the purpose described having in combination a tube provided with a point, a cement-outlet formed therein near said point, said tube having an imperforate portion throughout its circumference between said point and cement-outlet, and a plug-admission orifice between which and said point said cement-outlet is formed, and a plunger fitted within and closing said tube, substantially as set forth.

3. A repair-tool for the purpose described having in combination a tube provided with the inserting end and having a cement-outlet formed therein near said end, a plunger arranged in said tube and having a button 9, said tube being provided with a longitudinal slot for said button, and said slot having a stop for arresting the movement of said button, substantially as set forth.

4. A repair-tool for the purpose described having in combination a tube provided with a point and having a cement-outlet formed therein near said point, a plunger arranged in said tube and having a button 9, and said tube being provided with a longitudinal slot for the movement of said button and said slot having the offset 11 and notch 12, substantially as set forth.

5. A repair-tool for the purpose described having in combination a cylindrical tube provided with a point, a plug and cement-admission orifice 4 formed therein in said tube near the point, a cement-outlet formed in said tube between the point and said orifice, said tube between said point and said outlet and between said outlet and orifice being imperforate throughout its circumference, and a plunger fitted within said tube and adapted to close said orifice, substantially as set forth.

6. A repair-tool for the purpose described having in combination a tube provided with an inserting end, a cement-outlet near said end and a side orifice for the admission of cement to said tube, said tube also having an imperforate portion throughout its circumference between said cement-outlet and side orifice, and a plunger located in said tube, substantially as and for the purpose set forth.

DAVID A. SYME.

Witnesses:
F. A. HOPKINS,
EDNA B. JOHNSON.